Patented Nov. 9, 1943

2,333,696

UNITED STATES PATENT OFFICE 2,333,696

CHEMICAL PROCESS

Joseph E. Bludworth, Cumberland, Md., assignor to Celanese Corporation of America, a corporation of Delaware No Drawing. Application November 7, 1941, Serial No. 418,189

1 Claim. (Cl. 260—635)

This invention relates to the by-products of oxidation reactions, and more particularly to the utilization of the aqueous, quenched by-product mixture containing formaldehyde formed during the oxidation of lower aliphatic hydrocarbons in the vapor phase at elevated temperature and pressure.

An object of my invention is to utilize the aqueous quenched mixture of by-products formed during the oxidation of lower aliphatic hydrocarbons and, more particularly to utilize the formaldehyde contained in said mixture.

Another object of my invention is the manufacture of pentaerythritol and di-pentaerythritol from the formaldehyde-containing aqueous mixture of by-products formed during the oxidation of lower aliphatic hydrocarbons in the vapor phase without separating said aqueous mixture into the individual components thereof.

Yet another object of my invention is the preparation of pentaerythritol.

Still another object of my invention is the preparation of pentaerythritol and di-pentaerythritol in a relatively pure form from such mixtures.

Other objects of my invention will appear from the following detailed description.

During the oxidation of lower aliphatic hydrocarbons and mixtures of hydrocarbons such as butane, pentane, natural gasoline, light petroleum distillates, and other hydrocarbon mixtures with air or other oxygen-containing gas at elevated temperatures and pressures, as described in U. S. Patents Nos. 2,128,908, 2,128,909 and U. S. application S. No. 400,222 filed June 28, 1941, various products are formed. Among the many products which result from this oxidation reaction are acetaldehyde, acetone, methyl alcohol, propyl alcohol, butyl alcohol, formic acid, acetic acid and formaldehyde. In carrying out the reaction, the hydrocarbon and the oxidizing gas, usually air, are passed under pressure through a reactor heated to the proper temperature and, after the reaction has proceeded to the desired extent, the reactants are quenched to below reaction temperature by means of water which is introduced into the vapor stream issuing from the reactor. After the reactants have been cooled sufficiently, the resulting aqueous mixture may be passed to an accumulator where, upon standing, it separates into an upper and a lower layer. The upper layer comprises a layer of unreacted hydrocarbon in which is dissolved the water-insoluble products of oxidation as well as some of the water-soluble products, while the lower fraction comprises essentially an aqueous layer in which a proportion of the water-soluble products are dissolved. This lower aqueous fraction contains varying amounts of acetaldehyde, acetone, resinous materials, unconverted hydrocarbons, acetic acid, formic acid and formaldehyde, but the solution is largely composed of water. The separation of this multi-component and relatively dilute aqueous solution into its several fractions requires a prolonged series of distillations. Ordinarily, these distillations have been found to be essential, particularly where it was desired to obtain the oxidation products in relatively pure form suitable for use in subsequent chemical reactions or processes. Such distillations, however, result in an increase in the cost of obtaining these oxidation products and this increased cost is necessarily reflected in the cost of any products made therefrom.

I have now discovered that the multi-component aqueous solution obtained by quenching during the oxidation process heretofore described may be effectively utilized without the necessity for separating the solution into its individual components and subjecting said components to extensive purification prior to further use. More particularly, I have found that said relatively dilute formaldehyde-containing aqueous solution may be employed for the preparation of pentaerythritol and di-pentaerythritol in relatively pure form and high yield by reacting said formaldehyde-containing aqueous solution with acetaldehyde in the presence of a basic substance. The resulting reaction is found to be in no way inhibited by the presence in solution of the various other oxidation by-products and impurities and the reaction takes place rapidly, though the aqueous formaldehyde solution employed in the reaction is relatively dilute. By carrying out this reaction pentaerythritol and di-pentaerythritol are obtained in relatively high yield and in a form easily purified upon further recrystallization.

In carrying out the condensation reaction, satisfactory results may be obtained where the aqueous by-product solution contains formaldehyde in concentrations ranging from 3 to 30% by weight. Preferably, however, I employ aqueous by-product solutions which contain from 5 to 7% of formaldehyde. In addition to the formaldehyde present, the aqueous solutions may likewise contain, as stated, varying amounts of other oxidation products. Thus, for example, the aqueous solutions particularly suitable in accordance with my invention may also contain from 2 to 8% of acetic acid, 0.5 to 12% of acetaldehyde, 0.1 to 4% of unreacted hydrocarbons, 1 to 4% of formic acid, 0.2 to 6% of acetone and 0.1 to 10% of resinous materials. Aside from the acetaldehyde and acids present, these oxidation products, surprisingly enough, take little or no part in the reaction and are found to be substantially inert under the conditions of reaction which are employed. As a result, relatively little in the way of undesirable side reactions occur and the yield obtained is far more than might be expected considering the complex nature of the aqueous solution employed.

In carrying out the condensation reaction, the ratio of acetaldehyde employed to formaldehyde may be varied. Generally, while the reaction may be carried out employing a ratio of from 3 to 6 mols. of formaldehyde to 1 mol. of acetaldehyde, I preferably employ a ratio of about 4 mols. of formaldehyde per mol. of acetaldehyde. Since the aqueous by-product solution may contain from 5 to 7% by weight of formaldehyde as well as from 0.5 to 12% of acetaldehyde, the proportion of acetaldehyde added will vary with the relative concentration of formaldehyde and acetaldehyde present in the aqueous by-product solution in order to bring the mol. ratios to the point desired prior to reaction.

The temperature employed in promoting the condensation reaction may range from 20° to 65° C. Preferably, however, the reaction is carried out at temperatures of from 40 to 50° C., and the most advantageous yields are obtained when the reaction is maintained at about 45° C.

The basic substance employed to promote the reaction may be any suitable one such as, for example, calcium oxide, sodium hydroxide, soda lime, calcium hydroxide, barium hydroxide and magnesium oxide. Preferably, I employ calcium hydroxide in the preparation of pentaerythritol but where it is desired to produce a somewhat greater proportion of polymeric product such as di-pentaerythritol, it is more advantageous to use sodium hydroxide or soda lime as the basic condensing agent.

The reaction may generally be completed in from 30 to 180 minutes, after which the base may be substantially neutralized by the addition of an acid such as, for example, sulfuric acid. The insoluble inorganic salts present may then be removed by filtration and the pentaerythritol crystallized by cooling after the aqueous solution has been sufficiently concentrated by evaporation under vacuum.

In order further to illustrate my invention, but without being limited thereto, the following examples are given:

Example I

To 9,600 pounds of an aqueous by-product solution obtained from the accumulator after the vapor phase oxidation of lower aliphatic hydrocarbons, and having the following composition:

| | Percent by weight |
|---|---|
| Formaldehyde | 5.0 |
| Acetaldehyde | 0.8 |
| Propionic aldehyde | 0.1 |
| Formic acid | 1.2 |
| Acetic acid | 2.4 |
| Acetone | 0.8 |
| Methanol | 0.5 |
| Unconverted hydrocarbon | 1.0 |
| Propyl and butyl alcohol | 1.9 |
| Resinous materials | 0.2 | are added 99 pounds of acetaldehyde. To this mixture are added 413 pounds of calcium hydroxide over the course of one hour and the temperature of the resulting solution is maintained at about 45° C. by heating or cooling, as necessary, during the addition. The solution is then maintained at approximately 45° C. with constant stirring until the solution is slightly yellow or lemon-colored and the odor of formaldehyde disappears. The reaction is complete in about 1 hour. To the solution is then added 548 pounds of sulfuric acid of 66° Bé. while stirring vigorously. Calcium sulfate is precipitated by the addition of the sulfuric acid and is removed by filtration. After removal of the calcium sulfate, there are added 10 pounds of oxalic acid and calcium oxalate is precipitated and is likewise removed by filtration. The resulting filtrate is evaporated under vacuum until the concentrate weighs about 730 pounds and has a specific gravity of about 1.2. The evaporated liquor is then cooled to from 15 to 30° C. and pentaerythritol crystallizes out. The crude pentaerythritol is recrystallized from water and the yield is approximately 303 pounds, or 55% of theoretical. The product may contain less than 10% of di-pentaerythritol and melts at 220° C. Upon further purification by recrystallization the melting point rises to above 250° C.

Example II

To 12,000 pounds of an aqueous by-product solution containing 5% by weight of formaldehyde and having a composition analogous to the composition of the solution as given in Example I are added 80 pounds of acetaldehyde. To this mixture maintained at 45° C. are added with vigorous stirring over the course of 30 minutes 544 pounds of sodium hydroxide dissolved in 500 pounds of water. The temperature of the mixture is then brought up to 60° C. and there are added, over a period of 2 to 3 hours with continued vigorous stirring, an additional 40 pounds of sodium hydroxide until the solution becomes very slightly yellow in color and the odor of formaldehyde disappears. Sulfuric acid of 66° Bé. is then added rapidly with cooling and vigorous stirring until the solution is slightly acid. The solution is then evaporated under vacuum until a supersaturated solution is obtained after which the concentrated solution is cooled to from 15 to 30° C. and pentaerythritol and di-pentaerythritol crystallize out. The crystals are filtered and purified by recrystallization. The yield is 277 pounds or 51% of theoretical. About 30% of the 277 pounds is di-pentaerythritol. The mixture has a melting point of 175–180° C.

It is to be understood that the foregoing detailed description is merely given by way of illustration and that many variations may be made therein without departing from the spirit of my invention.

Having described my invention, what I desire to secure by Letters Patent is:

In a process for the manufacture of pentaerythritol, the step which comprises reacting formaldehyde while present in a dilute aqueous solution containing by-products and no more than 7% of formaldehyde and formed during the vapor phase oxidation of lower aliphatic hydrocarbons with acetaldehyde in the presence of a basic substance adapted to promote the reaction.

JOSEPH E. BLUDWORTH.